(12) United States Patent
Kinross et al.

(10) Patent No.: US 10,679,317 B2
(45) Date of Patent: Jun. 9, 2020

(54) TECHNIQUES FOR DISPLAYING A SHADER TABLE ASSOCIATED WITH RAYTRACING IMAGES

(71) Applicant: Microsoft Technology Licensing, LLC, Redmond, WA (US)

(72) Inventors: Austin Neil Kinross, Redmond, WA (US); Amar Patel, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/213,746

(22) Filed: Dec. 7, 2018

(65) Prior Publication Data
US 2020/0027190 A1    Jan. 23, 2020

Related U.S. Application Data

(60) Provisional application No. 62/700,695, filed on Jul. 19, 2018.

(51) Int. Cl.
*G06T 1/20* (2006.01)

(52) U.S. Cl.
CPC ...................................... *G06T 1/20* (2013.01)

(58) Field of Classification Search
None
See application file for complete search history.

(56) References Cited

U.S. PATENT DOCUMENTS

| | | | |
|---|---|---|---|
| 7,548,238 B2 | 6/2009 | Berteig et al. | |
| 8,159,491 B2 | 4/2012 | Capewell et al. | |
| 9,659,404 B2 | 5/2017 | Burley et al. | |
| 2009/0189909 A1* | 7/2009 | Jiao | G06T 1/60 345/506 |
| 2014/0347371 A1* | 11/2014 | Stenson | G06T 1/20 345/501 |
| 2017/0256020 A1* | 9/2017 | Sansottera | G06T 1/20 |
| 2019/0311531 A1* | 10/2019 | Stich | G06T 15/06 |

OTHER PUBLICATIONS

"DirectX Raytracing", Retrieved From: https://blogs.msdn.microsoft.com/pix/directx-raytracing/, Retrieved Date: Oct. 22, 2018, 7 Pages.
"Raytracing (DXR) Frame Debugging", Retrieved From: https://docs.nvidia.com/nsight-graphics/2018.4/content/nsight_graphics/raytracing_dxr debugging_d3d12.htm, Retrieved Date: Dec. 7, 2018, 2 Pages.

(Continued)

*Primary Examiner* — Jason A Pringle-Parker
(74) *Attorney, Agent, or Firm* — Arent Fox LLP

(57) ABSTRACT

Examples described herein generally relate to intercepting, from a graphics processing unit (GPU) or a graphics driver, a buffer that specifies one or more shader records of a shader table to use in generating the image using raytracing, determining, based at least in part on an identifier of the one or more shader records, a layout of the one or more shader records, interpreting, based at least in part on the layout, additional data in the buffer to determine one or more parameters corresponding to the one or more shader records, and displaying, via an application, an indication of the one or more parameters on an interface.

19 Claims, 8 Drawing Sheets

(56) References Cited

OTHER PUBLICATIONS

Persson, et al., "Ray Tracing on GPU", In Master Thesis of School of Computing, Jan. 2010, 25 Pages.

Standard, James D., "Ray-Triangle Intersection Testing With Tetrahedral Planes", Filed Date: Nov. 20, 2017, 100 Pages.

Stich, Martin, "Introduction to NVIDIA RTX and DirectX Ray Tracing", Retrieved From: https://devblogs.nvidia.com/Introduction-nvidia-rtx-directx-ray-tracing/, Mar. 19, 2018, 12 Pages.

Hargreaves, Shawn, "Introduction to DirectX Raytracing Part 2—the API", Retrieved from: http://intro-to-dxr.cwyman.org/presentations/IntroDXR_RaytracingAPI.pdf, Retrieved Date: Apr. 10, 2018, 35 Pages.

"International Search Report and Written Opinion Issued in PCT Application No. PCT/US19/037825", dated Sep. 13, 2019, 10 Pages.

\* cited by examiner

| Pipeline | | | | |
|---|---|---|---|---|
| Filter (Ctrl+E) | Global ID 3 | Raw -- Detailed | 1 records with warning(s) | |

| Shader Tables | Record | Layout | Root Signature | Root Argument Values | Offset (bytes) |
|---|---|---|---|---|---|
| RayGen | ⚠ 0 | myRayGenShader | obj#242 | | 0 |
| Miss | | Root CBV | Param 0 | res#1633 | 16 |
| Hit | | Root CBV | Param 1 | <invalid descriptor> ⚠ | 24 |
| | | Descriptor Table | Param 2 | obj#940 (index 3099) | 32 |
| | | Descriptor Table | Param 3 | obj#917 (index 3028) | 40 |
| | | Descriptor Table | Param 4 | obj#102 (index 0) | 48 |

502

| Info (Shader Table) |  |
|---|---|
| General Info | |
| Shader Table Size | 96 bytes |
| Shader Record Size | 96 bytes |
| Shader Ident. Size | 16 bytes |
| Largest Record Size | 56 bytes |

TECHNIQUES FOR DISPLAYING A SHADER TABLE ASSOCIATED WITH RAYTRACING IMAGES

CLAIM OF PRIORITY UNDER 35 U.S.C. § 119

The present Application for Patent claims priority to Provisional Application No. 62/700,695, entitled "TECHNIQUES FOR DISPLAYING A SHADER TABLE ASSOCIATED WITH RAYTRACING IMAGES" filed Jul. 19, 2018, which is assigned to the assignee hereof and hereby expressly incorporated by reference herein for all purposes.

BACKGROUND

Use of computing devices is becoming more ubiquitous by the day. Computing devices range from standard desktop computers to wearable computing technology and beyond. One area of computing devices that has grown in recent years is in the context of image rendering, such as rendering of games, video streams, etc., which typically rely on a graphics processing unit (GPU) to render graphics from a computing device to a display device based on rendering instructions received from the computing device. Raytracing of images is being developed as another solution for generating images, via an application, and requesting display of the images via a GPU. In raytracing, the application can define the image to be displayed and can define an acceleration structure to facilitate efficiently generating the image on a display.

The acceleration structure is used to rapidly determine which objects from a scene a particular ray is likely to intersect and to reject one or more objects that the ray will not hit. The determined objects can be drawn on the display based on information related to the ray intersecting the object. Moreover, in raytracing, the application can define shader tables specifying shaders to invoke when rays intersect or otherwise interact with something else in a raytracing scene. The GPU can draw the objects of the scene based on the rays and can invoke, based on the shader tables, the appropriate shaders when the rays intersect or interact with other objects in the raytracing scene.

SUMMARY

The following presents a simplified summary of one or more examples in order to provide a basic understanding of such examples. This summary is not an extensive overview of all contemplated examples, and is intended to neither identify key or critical elements of all examples nor delineate the scope of any or all examples. Its sole purpose is to present some concepts of one or more examples in a simplified form as a prelude to the more detailed description that is presented later.

In an example, a computer-implemented method for displaying shader table information used in raytracing an image is provided. The method includes intercepting, from a graphics processing unit (GPU) or a graphics driver, a buffer that specifies one or more shader records of a shader table to use in generating the image using raytracing, determining, by a computing device and based at least in part on an identifier of the one or more shader records, a layout of the one or more shader records, interpreting, by the computing device and based at least in part on the layout, additional data in the buffer to determine one or more parameters corresponding to the one or more shader records, and displaying, via an application executing on the computing device, an indication of the one or more parameters on an interface.

In another example, a computing device for displaying shader table information used in raytracing an image is provided. The computing device includes a memory storing one or more parameters or instructions for executing an operating system and one or more applications including a diagnostic application, and at least one processor coupled to the memory. The at least one processor is configured to intercept, from a GPU or a graphics driver, a buffer that specifies one or more shader records of a shader table to use in generating the image using raytracing, determine, based at least in part on an identifier of the one or more shader records, a layout of the one or more shader records, interpret, based at least in part on the layout, additional data in the buffer to determine one or more parameters corresponding to the one or more shader records, and display, via the diagnostic application, an indication of the one or more parameters on an interface.

In another example, a computer-readable medium, including code executable by one or more processors for displaying shader table information used in raytracing an image is provided. The code includes code for intercepting, from a GPU or a graphics driver, a buffer that specifies one or more shader records of a shader table to use in generating the image using raytracing, determining, based at least in part on an identifier of the one or more shader records, a layout of the one or more shader records, interpreting, based at least in part on the layout, additional data in the buffer to determine one or more parameters corresponding to the one or more shader records, and displaying, via an application, an indication of the one or more parameters on an interface.

To the accomplishment of the foregoing and related ends, the one or more examples comprise the features hereinafter fully described and particularly pointed out in the claims. The following description and the annexed drawings set forth in detail certain illustrative features of the one or more examples. These features are indicative, however, of but a few of the various ways in which the principles of various examples may be employed, and this description is intended to include all such examples and their equivalents.

BRIEF DESCRIPTION OF THE DRAWINGS

FIG. 5 illustrates an examples of an interface for displaying an error indication for a root argument in shader table information in accordance with examples described herein.

DETAILED DESCRIPTION

Figure 1:
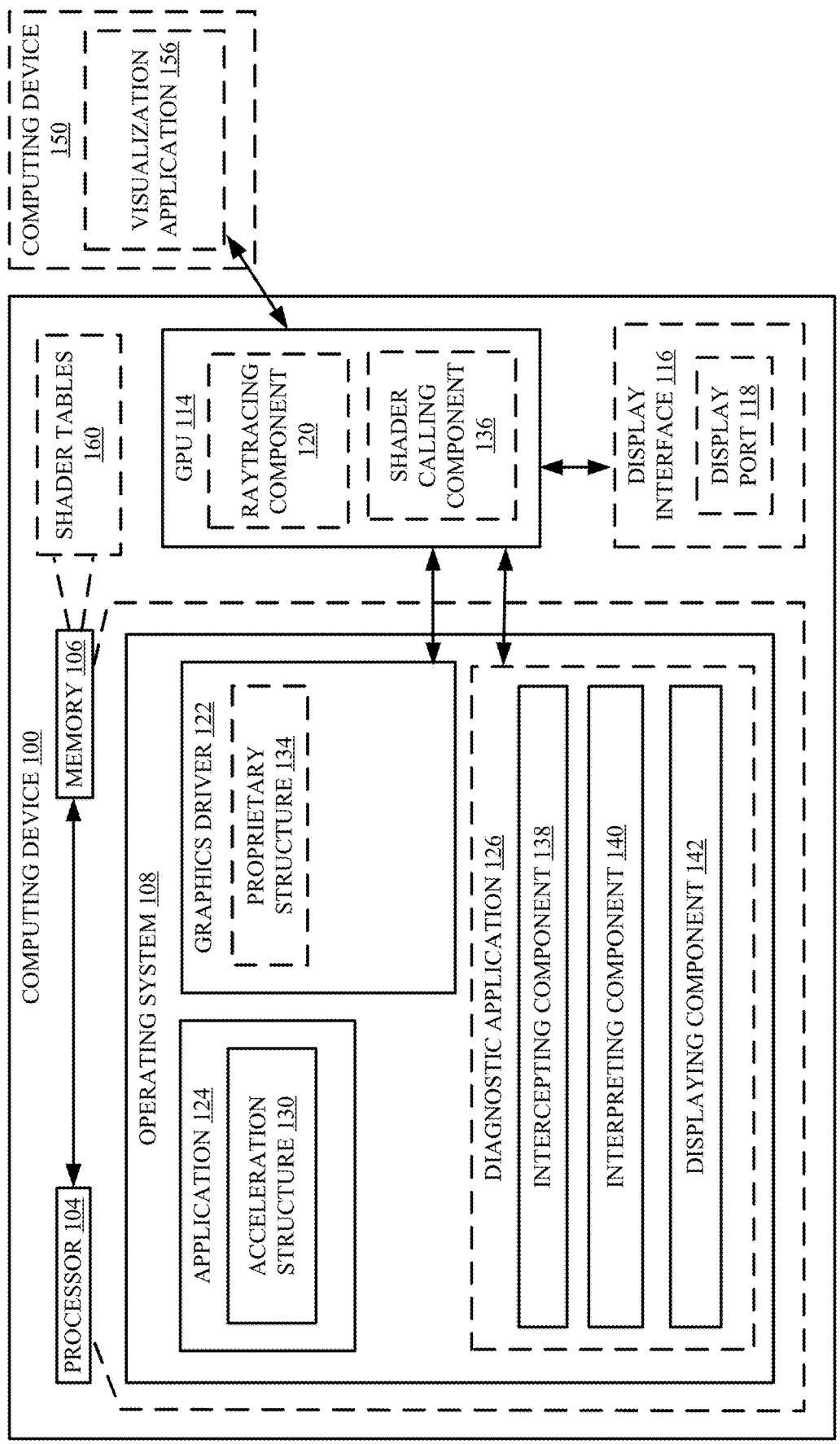
FIG. 1 is a schematic diagram of an example of a computing device for determining and displaying shader table information of images that can be raytraced by a graphics processing unit (GPU) in accordance with examples described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are various examples related to displaying parameters related to a shader table defined in raytracing images. The shader table can specify which shader to invoke when a ray interacts with something in a raytracing scene. For example, a shader table can include an array of shader records, where each record includes an identifier of a shader along with a set of parameters to pass to the shader when it is invoked. When raytracing a scene and a surface is encountered by a ray, the shader table can be indexed to pick a shader to execute (along with input parameters contributed from the ray, the object and the shader record). The shader tables are typically stored and/or are communicating in a collection of bytes, and may not be intuitive to interpret. In this regard, buffer data corresponding to the shader table can be intercepted and interpreted to provide a display of the data in a more intuitive format based on performing corresponding raytracing of an image (e.g., as opposed to displaying or otherwise merely obtaining the raw bytes of the shader table). For example, data from various buffers can be intercepted to determine which shader records are being utilized, parameters regard the shader records, etc., and the parameters can be displayed to allow a developer to visualize the parameters while the image is being raytraced and accordingly identify possible errors in the raytracing.

In a specific example, a buffer can be intercepted (e.g., from a graphics processing unit (GPU)) that represents at least a portion of a shader table. The buffer can include data that indicates one or more shader records, based on a shader record identifier, and corresponding data following the identifier. For example, the data in the buffer can indicate the one or more shader records being used at an instant in time during raytracing an image. In this example, the buffer, or another buffer, may indicate an association between the shader record identifier and a root signature or other construct. Moreover, in this example, the buffer, or another buffer, may indicate an association between the root signature and a layout of the data for the shader record. Accordingly, the shader record can be interpreted to determine one or more associated parameters, and the data can be displayed in a format indicating the one or more associated parameters for the given shader record, and can represent the shader record at an instant in time during raytracing. In one example, the buffer may also indicate a stride value between shader records to allow for determining where each shader record begins in the buffer.

In addition, in one example, possible errors in the shader record can be detected and identified to allow a developer to visualize the possible errors and/or correct instructions that are causing the errors. For example, the errors can be detected where expected values cannot be determined from the buffer and/or where the buffer data is otherwise determined to be at least partially corrupted. Thus, the concepts described herein provide for displaying information of shader tables and/or corresponding shader records, which may be otherwise difficult to interpret, to allow a developer to quickly and efficiently identify possible errors in raytracing and/or applying corresponding shaders to certain rays as the raytracing is performed.

Figure 2:
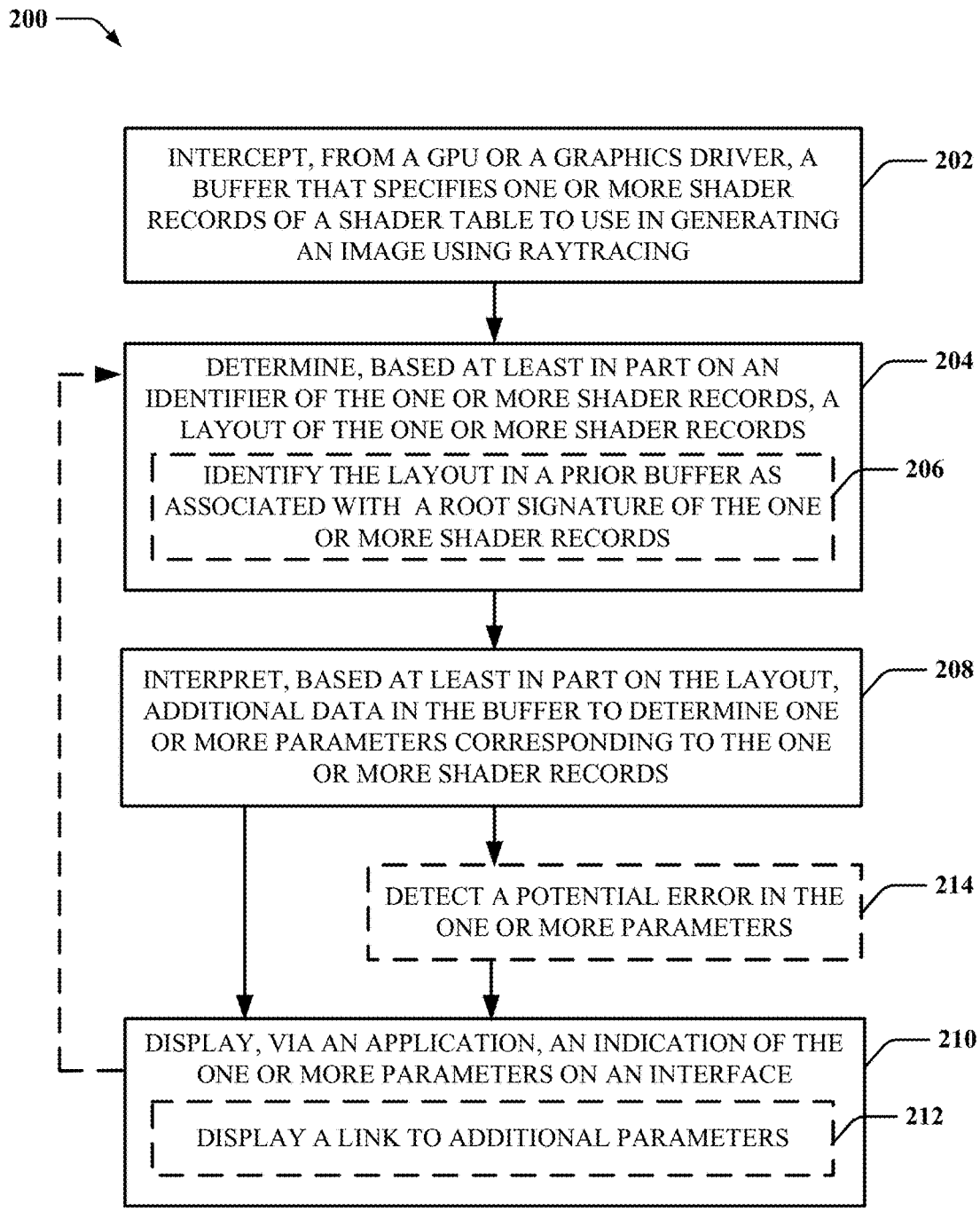
FIG. 2 is a flow diagram of an example of a method for determining and displaying shader table information in accordance with examples described herein.

Turning now to FIGS. 1-8, examples are depicted with reference to one or more components and one or more methods that may perform the actions or operations described herein, where components and/or actions/operations in dashed line may be optional. Although the operations described below in FIG. 2 are presented in a particular order and/or as being performed by an example component, the ordering of the actions and the components performing the actions may be varied, in some examples, depending on the implementation. Moreover, in some examples, one or more of the following actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a computing device 100 and/or related components for determining and displaying shader table information for images rendered using a GPU. For example, computing device 100 can include or can otherwise be coupled with a processor 104 and/or memory 106, where the processor 104 and/or memory 106 can be configured to execute or store instructions or other parameters related to determining or displaying the shader table information, as described herein. Computing device 100 can execute an operating system 108 (e.g., via processor 104 and/or memory 106) for providing an environment for executing one or more applications. The computing device 100 can also include a GPU 114 for processing rendering instructions, and/or communicating associated commands to a display interface 116 to cause display of one or more images on a display, which may be coupled to the computing device 100 via a display port 118.

In an example, display interface 116 can be communicatively coupled with the processor 104 and/or memory 106 for communicating with a display (not shown) via a display port 118. Display port 118, as referred to herein, can include one or more of various types of ports, including a high definition multimedia interface (HDMI) port, a display serial interface (DSI) port, a mobile industry processor interface (MIPI) DSI port, a universal serial bus (USB) port, a Firewire port, or other embedded or external wired or wireless display ports that can allow communications between computing device 100 and the display.

In one example, GPU 114 can be part of the display interface 116 (e.g., a processor on a circuit board of the display interface 116). In another example, GPU 114, display interface 116, etc., can be integrated with processor 104. Substantially any combination of hardware can be possible such that GPU 114, display interface 116, etc., can communicate with processor 104 via a bus to facilitate providing the rendering instructions to the GPU 114. GPU 114 can process the rendering instructions to render an image, and can initiate display of at least a portion of the image on the display by transmitting associated signals to the display via display port 118 of display interface 116.

In an example, GPU 114 can support raytracing, and thus may include a raytracing component 120 operable for receiving a proprietary structure 134 that can be generated by a graphics driver 122, and performing raytracing based on the proprietary structure 134 to render the image via the display interface 116. The graphics driver 122 can be specific to, and/or provided by, a manufacturer of the GPU 114 to generate the proprietary structure 134 to instruct the raytracing component 120 on performing the raytracing to display the image.

In one example, an application 124 can operate (e.g., via operating system 108) to generate images for displaying via display interface 116. Application 124 may generate an acceleration structure 130 that may define geometry for an image related to raytracing, which may include information on one or more objects in the image, a location corresponding to one or more objects in the image, etc., such that a raytracing capable GPU (e.g., GPU 114) can emulate photons sent out via rays, determine where light reflects, trace a point where the light returns from the scene, etc. to generate the image. In one example, application 124 can generate the acceleration structure 130 in a standardized format that can be provided to the graphics driver 122. The graphics driver 122 can generate a proprietary structure 134 based on the acceleration structure 130 to optimize the acceleration structure 130 for raytracing on the GPU 114, where the proprietary structure 134 may be of a proprietary format, may include efficiencies, etc. that are known by the graphics driver 122 but not necessarily known to the application 124, diagnostic application 126, etc.

In one example, the GPU 114 may optionally include a shader calling component 136 for invoking a shader while raytracing. For example, shader calling component 136 can invoke the shader based on one or more detected events associated with the shader (e.g., as defined by the application 124), such as detecting a ray interacting with something in the raytracing scene. For example, shader tables 160 may be defined (e.g., by the application 124) that specify parameters related to shaders for executing based on detecting rays interact with structures in the raytracing scene. In an example, the application-defined shader tables 160 can be byte arrays stored in GPU memory (e.g., a portion of memory 106 allocated to the GPU 114, memory physically on or near the GPU 114 where the GPU 114 is independent of processor 104, etc.) that are used by the runtime (e.g. operating system 108) and/or driver (e.g., graphics driver 122) to determine which shader is to be invoked when a ray interacts with something in a raytracing scene. The shader tables 160 can also specify which resources (e.g., buffers, textures, etc.) are to be bound to, or otherwise associated with, each shader.

The operating system 108 may also include a diagnostic application 126 for determining and displaying certain diagnostic information related to raytracing images, which may allow a developer to view and analyze parameters, memory states, etc. when images are being raytraced. For example, diagnostic application 126 may determine and display shader table information related to shaders invoked during the raytracing, and may do so as the shaders are invoked and/or utilized during the raytracing. For example, diagnostic application 126 can include an intercepting component 138 for intercepting data related to shaders being initialized or used by the GPU 114 in performing raytracing, which may include intercepting the data from application programming interface (API) calls from the GPU 114 to obtain data related to shader tables 160 for shaders being called, intercepting data from the processor 104 providing shader information to the GPU 114, and/or the like. For example, diagnostic application 126 may execute as the application 124 is executing and drawing images via raytracing and/or may allow for pausing the application 124 to analyze raytracing data at a desired instant in time. In this regard, diagnostic application 126 may also include an interpreting component 140 for interpreting the intercepted data to associated additional shader table information with the intercepted data, and/or a displaying component 142 for displaying, or otherwise rendering, the shader table information via an interface.

For example, the shader table information can be displayed via display interface 116. In an example, diagnostic application 126 may execute on the same computing device 100 or as diagnostic application 156 operating on a different computing device 150 (where the different computing device 150 can have a separate processor, memory, operating system, etc., to execute the diagnostic application 156) so long as the diagnostic application 126, 156 can at least communicate with GPU 114 (or a related component) to determine and/or receive the shader table information, related buffers, etc., as described herein. In displaying the shader table information, the diagnostic application 126, 156 can provide some additional context to allow for interaction with the shader table information, more simplified identification of possible errors represented in the shader table information, etc.

FIG. 2 is a flowchart of an example of a method 200 for determining and displaying shader table information related to shaders invoked by a GPU in raytracing or otherwise rendering images. For example, method 200 can be performed by the computing device 100, and is accordingly described with reference to FIG. 1, as a non-limiting example of an environment for carrying out method 200.

In method 200, at action 202, a buffer that specifies one or more shader records of a shader table to use in generating an image using raytracing can be intercepted from a GPU or a graphics driver. In an example, intercepting component 138, e.g., in conjunction with processor 104, memory 106, diagnostic application 126, 156, etc., can intercept, from the GPU 114 or the graphics driver 122 (e.g., or a communication therebetween), the buffer that specifies one or more shader records of the shader table to use in generating the image using raytracing. For example, intercepting component 138 may intercept the buffer from shader calling component 136 calling a shader for executing (e.g., when a ray interacts with another object in the raytracing scene). For example, intercepting component 138 can intercept the buffer in an API call to invoke the shader, where the API call can be received from the GPU 114, by obtaining a portion of memory 106 based on detecting invocation of the shader, etc.

In an example, the buffer can include a byte array with data related to multiple shader records in the shader table. Each shader record can begin at a memory location represented by a stride (e.g., a number of bytes) in the buffer, and/or an initial shader record can begin at a known memory location (e.g., the start of the buffer, a known offset from the start of the buffer, etc.). In an example, the stride may be indicated in the buffer or in another intercepted or received information. In one example, intercepting component 138 may intercept the stride information when the shader or shader table is initialized, as part of intercepting or otherwise receiving (e.g., via an API call to/from the GPU 114) shader table information. In another example, intercepting component 138 may determine the stride information from the intercepted buffer (e.g., which may be indicated in a first n bytes or other known location in the buffer, etc.). In addition, each shader record within the buffer may include a shader identifier in a known portion of bytes (e.g., a first n bytes or other known location of the shader record). In this regard, given the stride and the identifier length, the shader records and corresponding identifiers can be determined from the buffer, and used to obtain additional shader record information, as described further herein.

In method 200, at action 204, a layout of the one or more shader records can be determined based at least in part on an identifier of the one or more shader records. In an example, interpreting component 140, e.g., in conjunction with processor 104, memory 106, diagnostic application 126, 156, etc., can determine, based at least in part on the identifier of the one or more shader records, the layout of the one or more shader records. For example, interpreting component 140 may also receive an indication of a relationship between a given shader record and a value associated with the layout of the shader record.

In one example, determining the layout at action 204 may optionally include, at action 206, identifying the layout in a prior buffer as associated with a root signature of the one or more shader records. In an example, interpreting component 140, e.g., in conjunction with processor 104, memory 106, diagnostic application 126, 156, etc., can identify the layout in the prior buffer as associated with the root signature of the one or more shader records. For example, interpreting component 140 can receive the prior buffer based on the application 124 initializing the shaders corresponding to the one or more shader records, based on the application 124 providing shader information corresponding to the one or more shader records to the GPU 114 (e.g., by intercepting the shader information or otherwise receiving the shader information from the application 124 and/or GPU 114, such as once the GPU 114 receives and sets up the shaders and/or corresponding shader table), and/or the like. For example, interpreting component 140 may determine a list of root signatures and corresponding layouts of shader records based on data in the prior buffer. For example, a root signature can define a parameter layout, similar in concept to what a function signature may be in general programming languages. In the context of raytracing, for example, root signatures can be used to define the layout of parameters to a shader within a shader record. For example, the prior buffer may be received as part of initializing the shader or shader table.

In addition, in this example, the interpreting component 140 can determine a root signature associated with the identifier of the shader record, which may be based on further data in the buffer (e.g., data in the shader record after the shader identifier). In another example, the interpreting component 140 can receive an indication of the layout from the application 124, GPU 114, etc., where the layout can indicate, for a given root signature, the fields defined for a shader record having the root signature. The interpreting component 140 can then match the root signature for a given received shader record to the appropriate layout. For example, the layout can define further fields in the shader record data (e.g., field names, byte lengths, etc.) to facilitate interpreting the data.

In method 200, at action 208, additional data in the buffer can be interpreted, based at least in part on the layout, to determine one or more parameters corresponding to the one or more shader records. In an example, interpreting component 140, e.g., in conjunction with processor 104, memory 106, diagnostic application 126, 156, etc., can interpret, based at least in part on the layout, the additional data in the buffer to determine the one or more parameters corresponding to the one or more shader records. For example, the interpreting component 140 can determine the layout associated with the root signature, as described, and can accordingly determine one or more related parameters, such as a root constant, a root descriptor, or a root descriptor handle, etc., based on the layout. For example, the layout may indicate a number of bytes for each parameter, and the interpreting component 140 can read the parameter values after the initial bytes corresponding to the identifier, root signature, and/or the like.

In method 200, at action 210, an indication of the one or more parameters can be displayed, via an application, on an interface. In an example, displaying component 142, e.g., in conjunction with processor 104, memory 106, diagnostic application 126, 156, etc., can display, via an application (e.g., diagnostic application 126, 156) the indication of the one or more parameters on the interface. Other renderings may be possible as well, such as audio rendering, virtual reality displaying, etc. Moreover, examples of possible interfaces are depicted and described herein. In one example, a table of shader records in the buffer data can be displayed. In another example, detected potential errors can be indicated on the interface as well. In addition, the method may continue to action 204 to determine, interpret, and display other shader records in the buffer data (e.g., subsequent shader records based on advancing a pointer to a subsequent memory location based on the stride value).

In another example, at action 212, a link to additional parameters can be displayed. In an example, displaying component 142, e.g., in conjunction with processor 104, memory 106, diagnostic application 126, 156, etc., can display the link to the additional parameters, which may include displaying a parameter value as the link. For example, the link may indicate an offset into the buffer of data corresponding to a given shader record, and activating the link may cause display of the actual bytes of data in the buffer that correspond to the shader record. In another example, the link may indicate the root structure, and activating the link may cause display of parameters related to the root structure itself, such as the layout.

In method 200, optionally at action 214, a potential error can be detected in the one or more parameters. In an example, interpreting component 140, e.g., in conjunction with processor 104, memory 106, diagnostic application 126, 156, etc., can detect the potential errors in the one or more parameters. For example, interpreting component 140 may detect invalid memory locations represented by data in the buffer, null values in the buffer, partially corrupted records where values other than those expected are detected in the buffer at one or more locations, etc. In this example, displaying component 142 may display an indication of the potential error to alert a developer. For example, detecting the potential error may include detecting a value in the one or more parameters as not being within a memory location boundary, detecting a null value (e.g., for the root signature), detecting an invalid value (e.g., for the root signature, such as where the invalid value is not indicated in a mapping of root signatures to layouts), and/or the like.

In other examples, displaying the indication of the one or more parameters may also include mapping parameter values to other values indicated by the application 124 (e.g., in an intercepted API call). For example, intercepting component 138 may intercept an API call to associate a root signature with a label. In this example, in interpreting the data, interpreting component 140 can determine the label associated with the root signature, and displaying component 142 can display the label instead of (or in addition to) the root signature when displaying the shader record data.

Figure 3:
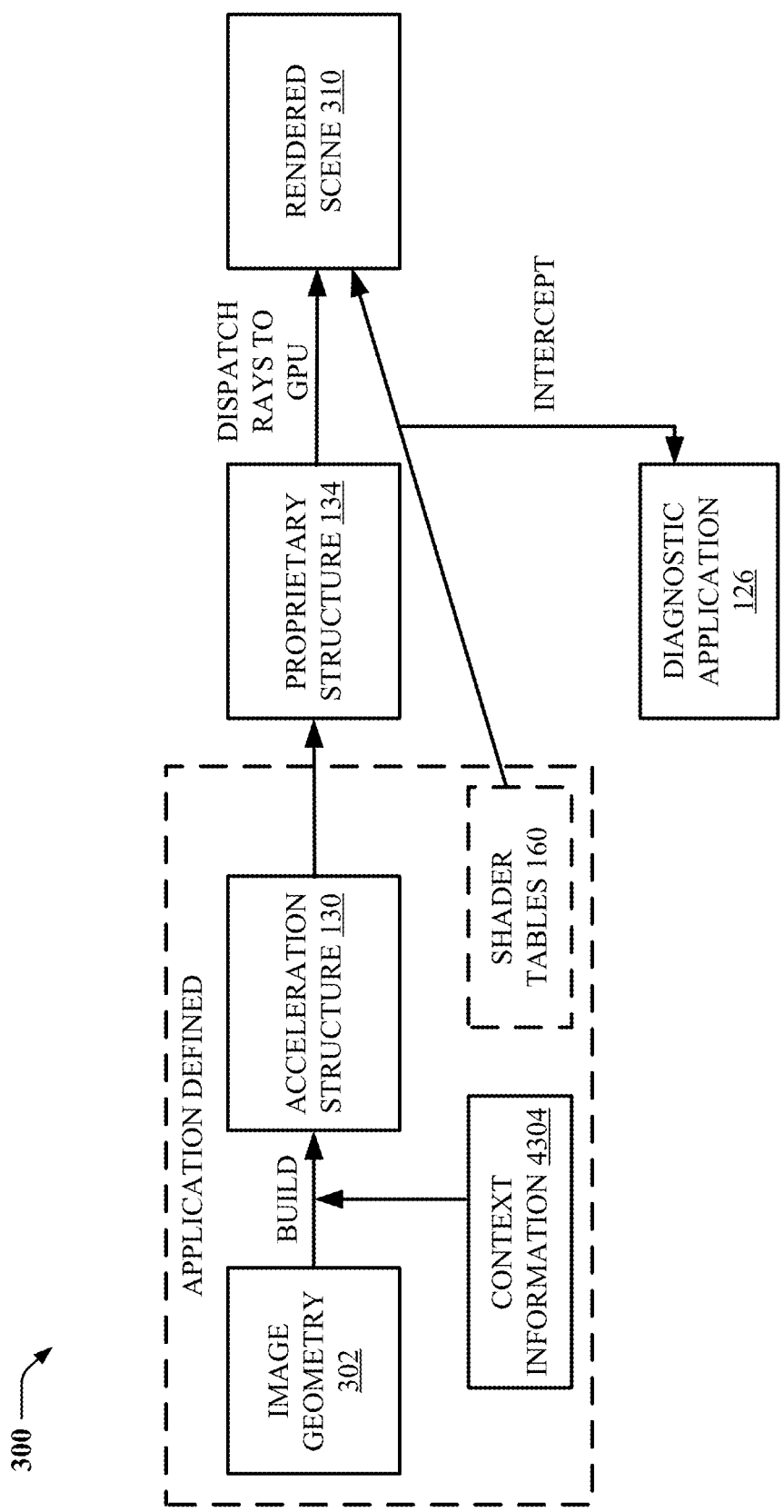
FIG. 3 illustrates an example of a data flow for intercepting image data to determine and display the shader table information in accordance with examples described herein.

FIG. 3 illustrates an example of a data flow 300 of image data from image geometry 302 created by an application (e.g., application 124) to a rendered scene 310. In this example, an application, such as application 124, can generate image geometry 302 to be rendered on a display. The application 124 can combine the image geometry 302 along with context information 304 to build an acceleration structure 130 representing the image geometry 302. For example, the context information 304 may include location of object within the image, color of objects within the image, one or more shaders used to generate the image, etc. In any case, the application 124 may build the acceleration structure 130, which may include calling an API or other mechanism to generate a standardized acceleration structure 130. In an example, where the acceleration structure 130 is generated to include bounding boxes, one or more shader tables 160 can also be created or otherwise determined or employed to define certain parameters of the image, such as object shape/orientation, shading parameters, intersection points, etc., as described.

The acceleration structure 130 can be used to generate the proprietary structure 134 (e.g., by the graphics driver) for instructing a GPU on raytracing the image of the rendered scene 310. For example, the proprietary structure 134 can be used to dispatch rays to the GPU (e.g., GPU 114) for performing the raytracing to generate the rendered scene 310. In another example, the shader tables 160 can also be provided for invoking shaders to generate the rendered scene 310 based on the proprietary structure 134. In addition, for example, the shader tables 160 and/or related information, calls, parameters, etc., may be intercepted by diagnostic application 126, 156, such as by receiving via API call to/from the GPU 114, application 124, etc. As described, the diagnostic application 126, 156 can interpret this information to determine parameters related to the shader tables, corresponding shader records, etc., which can be displayed for diagnostic purposes as the image is raytraced, as described. Moreover, as described, application 124 can provide the image geometry 302 and the diagnostic application 126 can allow for pausing the application 124 or the corresponding raytracing to step through the raytracing to analyze the shader tables 160 at given instants in time.

Figure 4:
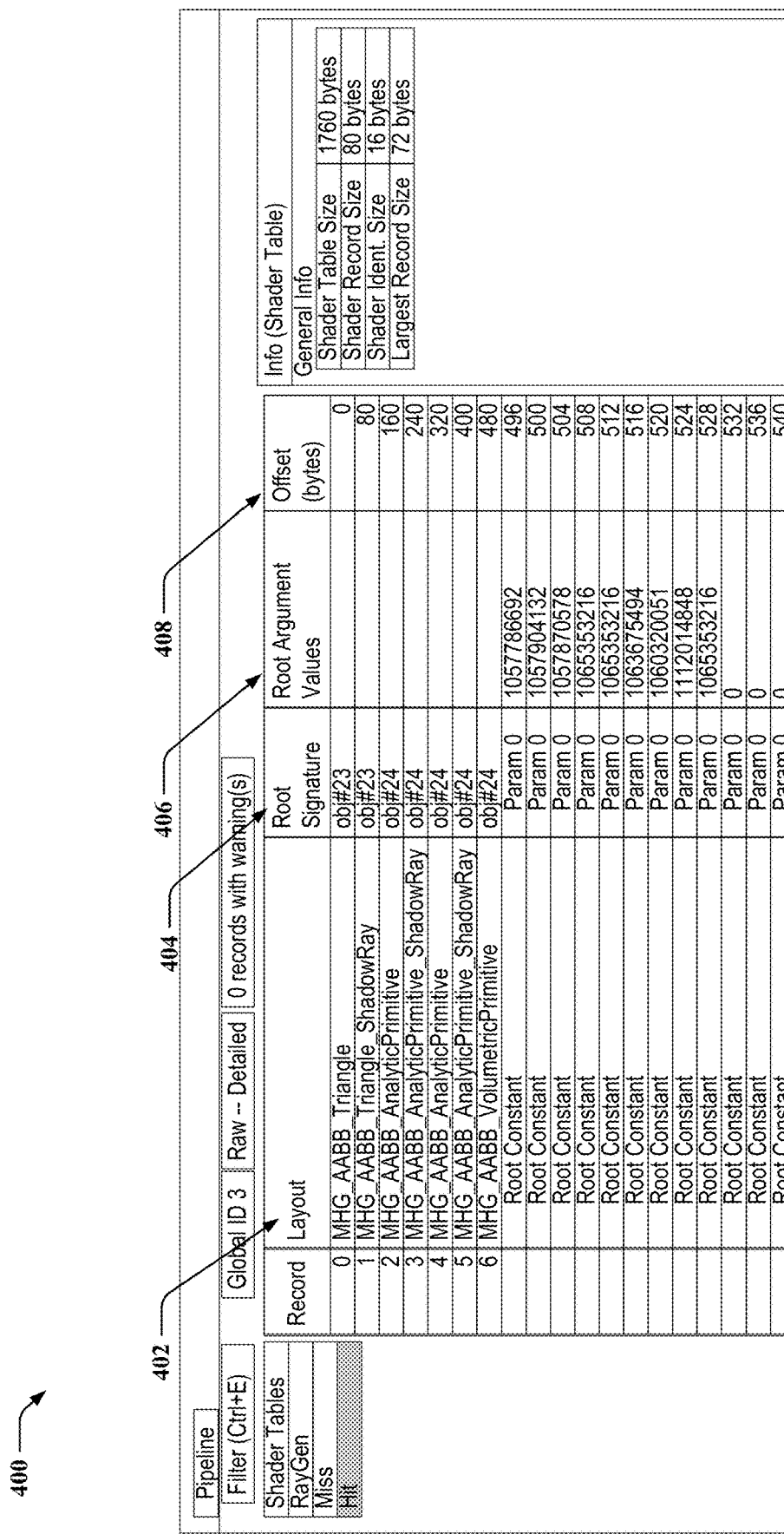
FIG. 4 illustrates an examples of an interface for displaying shader table information in accordance with examples described herein.

FIG. 4 illustrates an example of an interface 400 for displaying shader records interpreted from intercepted shader table buffer data, as described herein. For example, interface 400 can display shader table information for a shader invoked at an instant in time of raytracing an image. In an example, the diagnostic application 126, 156 can execute as the raytracing is performed, and can display interfaces, such as interface 400 or other interfaces described below, as the raytracing occurs. In one example, the diagnostic application 126, 156 can include a pause function to pause raytracing to allow inspection of the shader table data and/or can log the shader table data for subsequent viewing, etc.

For example, interface 400 can display shader record identifiers 402 of corresponding shader records, root signatures 404, root argument values or constants 406, offsets 408, etc., as described by diagnostic application 126 via its various subcomponents, as described above. Additionally as described, for example, the root signature 404 can be a link to cause display of information regarding the root signature.

In addition, the offset 408 can be a link to cause display of the data in the buffer at the specified offset. In this example, interface 400 can present a user-friendly display of a shader table 160 that helps developers understand how its underlying bytes are interpreted by the runtime/driver. In this regard, the diagnostic application 126, 156 takes additional context supplied by the application 124 at capture-time, such as stride/size parameters related to the shader table 160, root signatures, and capture-time shader identifier maps, to show how each byte of the shader table are interpreted by the runtime/driver. This can enable developers to easily diagnose issues in their shader tables. Furthermore, it can enable the diagnostic application 126, 156 to display automated warnings that inform developers of potential problems with their shader tables, such as invalid shader identifiers or null descriptor handles, as described and shown further herein.

In addition, though shown and described with respect to shader tables 160, the concepts described herein can be used with other data that helps the GPU 114 understand how to raytrace or otherwise render a scene. One such example could be data that is used by the GPU 114 when performing "Indirect Rendering," also known as "ExecuteIndirect." This can involve "argument buffers" in GPU memory whose contents specify which rendering commands the GPU 114 should perform, and with which parameters. The concepts described herein for viewing shader tables, for example, could be applied to visualize indirect argument buffers' contents. In this, and other examples to which these techniques could be applied, the diagnostic application 126, 156 can similarly interpret and provide a representation of the data (e.g., as a list of records).

FIG. 5 illustrates an example of an interface 500 for displaying shader records interpreted from intercepted shader table buffer data and an indication of a possible error, as described herein. For example, interface 500 can display an icon 502 indicating incorrect bytes for Param 1 at bytes 24-31. For example, the diagnostic application 126, 156 may have expected this to be a pointer to a resource in GPU memory corresponding to Root CBV, but the bytes in the buffer data set to correspond to the parameter may have been detected (e.g., by interpreting component 140, as described above) as being invalid (e.g., outside the bounds of memory locations for the parameter, etc.). Interpreting component 140 can detect this potential error, and displaying component 142 can display the indicator icon 502 at the corresponding root argument value.

Figure 6:
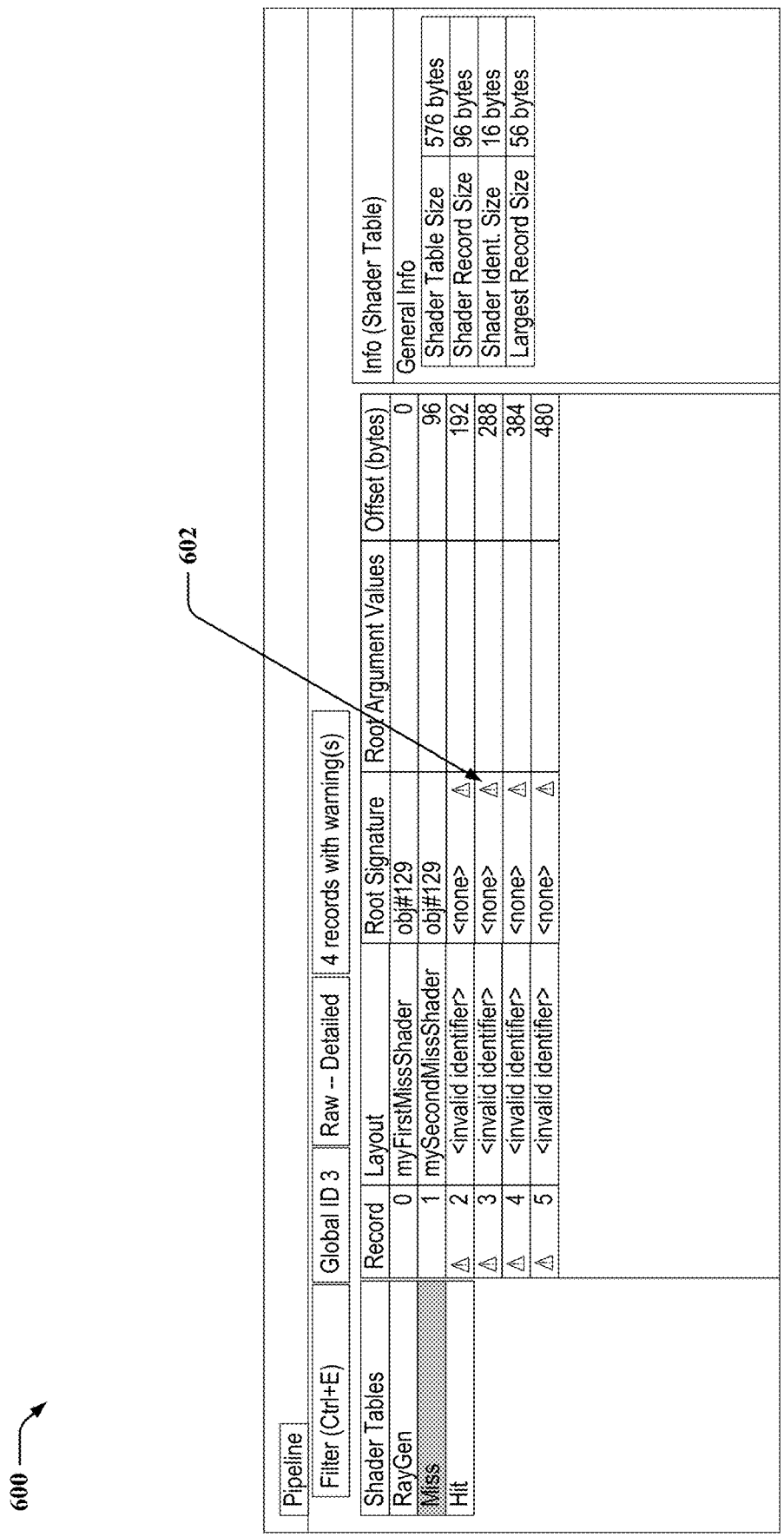
FIG. 6 illustrates an examples of an interface for displaying an error indication for shader records in shader table information in accordance with examples described herein.

FIG. 6 illustrates an example of an interface 600 for displaying shader records interpreted from intercepted shader table buffer data and an indication of a possible error, as described herein. For example, interface 600 can display icons 602 indicating no data for the last four shader records in the table. For example, this may have been deliberate (e.g. if the developer knew that they were not going to use these shader records at runtime), but it may have been a mistake. Interpreting component 140 can detect this potential error as null data in the table where records were expected (e.g., based on a number of records and/or stride value), and displaying component 142 can display the indicator icon(s) 602 at the corresponding record layout.

Figure 7:
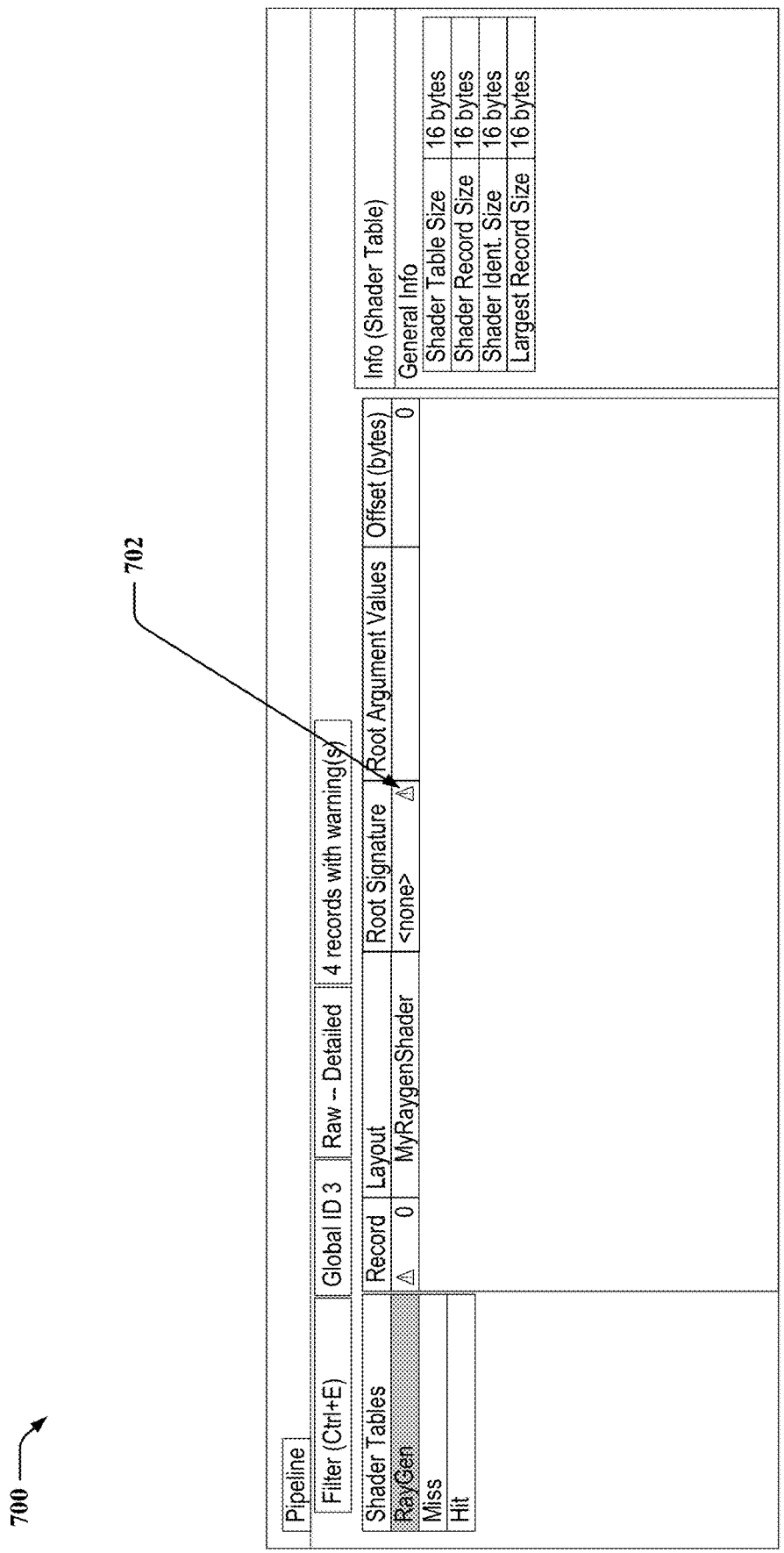
FIG. 7 illustrates an examples of an interface for displaying as error indication for a root signature association in shader table information in accordance with examples described herein.

FIG. 7 illustrates an example of an interface 700 for displaying shader records interpreted from intercepted shader table buffer data and an indication of a possible error, as described herein. For example, interface 700 can display an icon 702 indicating that developer did not associate a root signature with the shader record. Interpreting component 140 can detect this potential error (e.g., based on detecting the shader record but not being able to determine (or determining a null value for) the root signature), and displaying component 142 can display the indicator icon 702 at the corresponding root signature.

Figure 8:
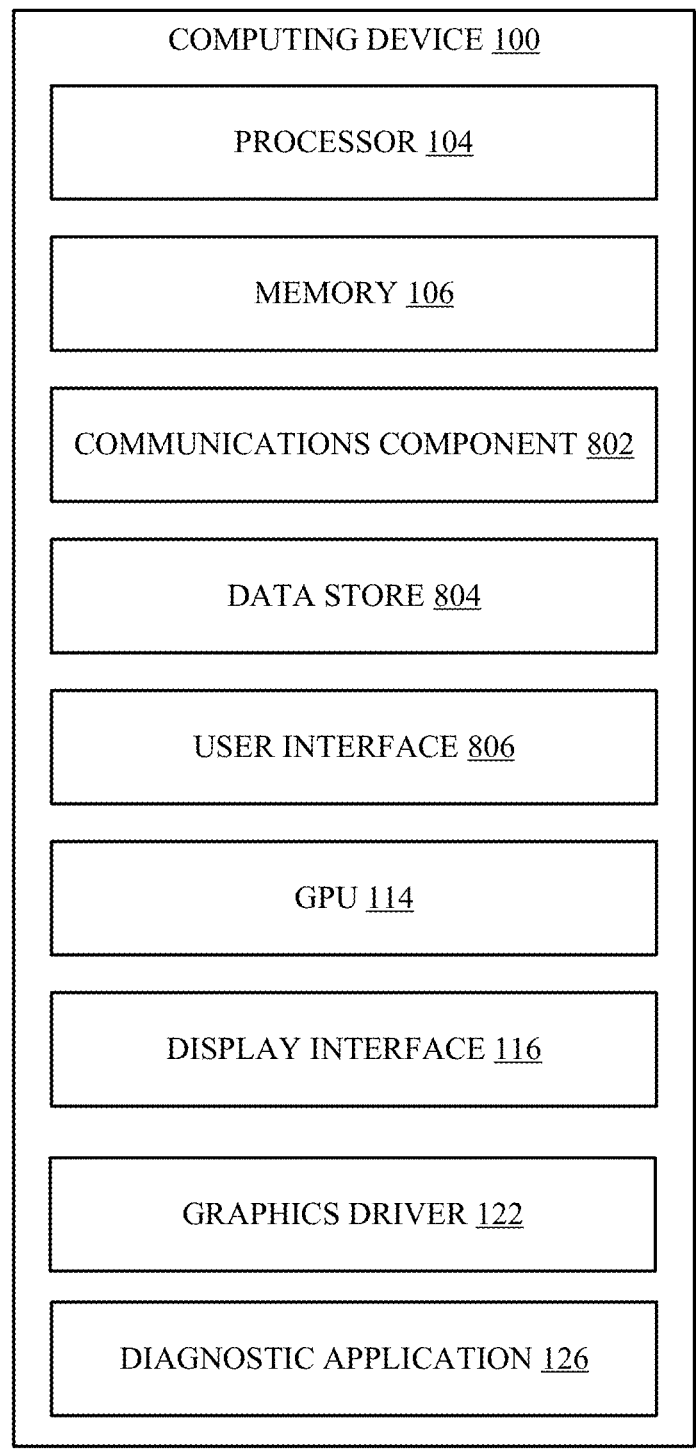
FIG. 8 is a schematic diagram of an example of a computing device for performing functions described herein.

FIG. 8 illustrates an example of computing device 100 including additional optional component details as those shown in FIG. 1. In one example, computing device 100 may include processor 104 for carrying out processing functions associated with one or more of components and functions described herein. Processor 104 can include a single or multiple set of processors or multi-core processors. Moreover, processor 104 can be implemented as an integrated processing system and/or a distributed processing system.

Computing device 100 may further include memory 106, such as for storing local versions of applications being executed by processor 104, related instructions, parameters, etc. Memory 106 can include a type of memory usable by a computer, such as random access memory (RAM), read only memory (ROM), tapes, magnetic discs, optical discs, volatile memory, non-volatile memory, and any combination thereof. Additionally, processor 104 and memory 106 may include and execute an operating system executing on processor 104, one or more applications, such as graphics driver 122, diagnostic application 126, and/or components thereof, display drivers, etc., as described herein, and/or other components of the computing device 100.

Further, computing device 100 may include a communications component 802 that provides for establishing and maintaining communications with one or more other devices, parties, entities, etc. utilizing hardware, software, and services as described herein. Communications component 802 may carry communications between components on computing device 100, as well as between computing device 100 and external devices, such as devices located across a communications network and/or devices serially or locally connected to computing device 100. For example, communications component 802 may include one or more buses, and may further include transmit chain components and receive chain components associated with a wireless or wired transmitter and receiver, respectively, operable for interfacing with external devices. For example, communications component 802 can carry communications between diagnostic application 126 and a GPU on another device, between distributed components of diagnostic application 126, etc.

Additionally, computing device 100 may include a data store 804, which can be any suitable combination of hardware and/or software, that provides for mass storage of information, databases, and programs employed in connection with examples described herein. For example, data store 804 may be or may include a data repository for applications and/or related parameters not currently being executed by processor 104. In addition, data store 804 may be a data repository for an operating system, application, such as graphics driver 122, diagnostic application 126, and/or components thereof, display driver, etc. executing on the processor 104, and/or one or more other components of the computing device 100.

Computing device 100 may also include a user interface component 806 operable to receive inputs from a user of computing device 100 and further operable to generate outputs for presentation to the user (e.g., via display interface 116 to a display device). User interface component 806 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, any other mechanism capable of receiving an input from a user, or any combination thereof. Further, user interface component 806 may include one or more output devices, including but not limited to a display interface 116, a speaker, a haptic feedback mechanism, a printer, any other mechanism capable of presenting an output to a user, or any combination thereof. In an example, user interface component 806 can display or can include interface 400, 500, 600, 700 or similar interfaces to display memory usage information, as described herein.

Computing device 100 can also include a GPU 114, as described herein, for rendering images based on raytracing instructions received from processor 104. GPU 114 can additionally send signals via a display interface 116 to cause display of the rendered images on a display (not shown). Additionally, computing device 100 may include a graphics driver 122, as described herein, to provide the raytracing instructions (e.g., in a proprietary structure) to the GPU 114, as described herein. Additionally, computing device 100 may include a diagnostic application 126, as described herein, to determine and display shader table information.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more examples, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various examples described herein. Various modifications to these examples will be readily apparent to those skilled in the art, and the generic principles defined herein may be applied to other examples. Thus, the claims are not intended to be limited to the examples shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various examples described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A computer-implemented method for displaying shader table information used in raytracing an image, comprising:
    intercepting, from a graphics processing unit (GPU) or a graphics driver, a buffer that specifies shader table information including one or more shader records of shaders to use in generating the image using raytracing;
    determining, by a computing device and based at least in part on an identifier of the one or more shader records, a layout of parameters within the buffer for one or more shaders corresponding to the one or more shader records;
    interpreting, by the computing device and based at least in part on the layout of parameters, additional data in the buffer to determine one or more parameters corresponding to the one or more shader records;
    detecting at least one of an invalid memory location in the one or more parameters or, based on the layout, a null root signature associated with the one or more shader records; and
    displaying, via an application executing on the computing device, an indication of the one or more parameters on an interface and an indicator of at least one of the invalid memory location or the null root signature.

2. The computer-implemented method of claim 1, further comprising intercepting, from the GPU or the graphics driver, a prior buffer that specifies a root signature and the layout, wherein determining the layout comprises:
    associating the identifier of the one or more shader records with the root signature; and
    identifying, in the prior buffer, the layout that corresponds to the root signature.

3. The computer-implemented method of claim 2, wherein associating the identifier of the one or more shader records with the root signature comprises identifying the root signature from the buffer.

4. The computer-implemented method of claim 1, further comprising:
    intercepting, from the GPU or the graphics driver, a prior buffer that specifies a stride between shader records in the shader table;
    identifying a second shader record based on a location of the stride from the one or more shader records;
    determining, based at least in part on a second identifier of the second shader record of the one or more shader records detected in the buffer, a second layout of the second shader record;
    interpreting, based at least in part on the second layout, additional second data in the buffer to determine one or more second parameters corresponding to the second shader record; and
    displaying, via the application executing on the computing device, a second indication of the one or more second parameters on the interface.

5. The computer-implemented method of claim 1, wherein the one or more parameters include at least one of a root constant, a root descriptor, or a root descriptor handle.

6. The computer-implemented method of claim 1, wherein displaying the indication of the one or more parameters comprises displaying a link to a root signature associated with the one or more shader records, wherein the link is associated with displaying additional parameters regarding the root signature.

7. The computer-implemented method of claim 1, wherein displaying the indication of the one or more parameters comprises displaying a link to an offset of bytes in the buffer associated with the one or more shader records, wherein the link is associated with displaying bytes associated with the one or more shader records.

8. A computing device for displaying shader table information used in raytracing an image, comprising:
    a memory storing one or more parameters or instructions for executing an operating system and one or more applications including a diagnostic application; and
    at least one processor coupled to the memory, wherein the at least one processor is configured to:
    intercept, from a graphics processing unit (GPU) or a graphics driver, a buffer that specifies information including one or more shader records of shaders to use in generating the image using raytracing;
    determine, based at least in part on an identifier of the one or more shader records, a layout of parameters within the buffer for one or more shaders corresponding to the one or more shader records;
    interpret, based at least in part on the layout of parameters, additional data in the buffer to determine one or more parameters corresponding to the one or more shader records; and
    display, via the diagnostic application, an indication of the one or more parameters on an interface,
    wherein the at least one processor is further configured to intercept, from the GPU or the graphics driver, a prior buffer that specifies a root signature and the layout, wherein the at least one processor is configured to determine the layout at least in part by:
    associating the identifier of the one or more shader records with the root signature; and
    identifying, in the prior buffer, the layout that corresponds to the root signature.

9. The computing device of claim 8, wherein the at least one processor is configured to associate the identifier of the one or more shader records with the root signature at least in part by identifying the root signature from the buffer.

10. The computing device of claim 8, wherein the at least one processor is further configured to:
    intercept, from the GPU or the graphics driver, another prior buffer that specifies a stride between shader records in the shader table;
    identify a second shader record based on a location of the stride from the one or more shader records;
    determine, based at least in part on a second identifier of the second shader record of the one or more shader records detected in the buffer, a second layout of the second shader record;
    interpret, based at least in part on the second layout, additional second data in the buffer to determine one or more second parameters corresponding to the second shader record; and display, via the diagnostic application, a second indication of the one or more second parameters on the interface.

11. The computing device of claim 8, wherein the at least one processor is configured to detect an invalid memory location in the one or more parameters, wherein the at least one processor is configured to display the indication of the one or more parameters as an indicator associated with the invalid memory location.

12. The computing device of claim 8, wherein the at least one processor is configured to detect, based on the layout, a null root signature associated with the one or more shader records, wherein the at least one processor is configured to display the indication of the one or more parameters as an indicator of the null root signature.

13. The computing device of claim 8, wherein the one or more parameters include at least one of a root constant, a root descriptor, or a root descriptor handle.

14. The computing device of claim 8, wherein the at least one processor is configured to display the indication of the one or more parameters as a link to another root signature associated with the one or more shader records, wherein the link is associated with displaying additional parameters regarding the another root signature.

15. The computing device of claim 8, wherein the at least one processor is configured to display the indication of the one or more parameters as a link to an offset of bytes in the buffer associated with the one or more shader records, wherein the link is associated with displaying bytes associated with the one or more shader records.

16. A non-transitory computer-readable medium, comprising code executable by one or more processors for displaying shader table information used in raytracing an image, the code comprising code for:
   intercepting, from a graphics processing unit (GPU) or a graphics driver, a buffer that specifies information including one or more shader records of shaders to use in generating the image using raytracing;
   determining, based at least in part on an identifier of the one or more shader records, a layout of parameters within the buffer for one or more shaders corresponding to the one or more shader records;
   interpreting, based at least in part on the layout of parameters, additional data in the buffer to determine one or more parameters corresponding to the one or more shader records; and
   displaying, via an application, an indication of the one or more parameters on an interface,
   wherein the code for displaying displays the indication of the one or more parameters as a link to a root signature associated with the one or more shader records, wherein the link is associated with displaying additional parameters regarding the root signature.

17. The non-transitory computer-readable medium of claim 16, further comprising code for intercepting, from the GPU or the graphics driver, a prior buffer that specifies another root signature and the layout, wherein the code for determining the layout:
   associates the identifier of the one or more shader records with the another root signature; and
   identifies, in the prior buffer, the layout that corresponds to the another root signature.

18. The non-transitory computer-readable medium of claim 16, further comprising code for detecting an invalid memory location in the one or more parameters, wherein the code for displaying displays the indication of the one or more parameters as an indicator associated with the invalid memory location.

19. The non-transitory computer-readable medium of claim 16, further comprising code for detecting, based on the layout, a null root signature associated with the one or more shader records, wherein the code for displaying displays the indication of the one or more parameters as an indicator of the null root signature.

* * * * *